United States Patent [19]

Sand

[11] Patent Number: 4,720,854
[45] Date of Patent: Jan. 19, 1988

[54] ARCHITECTURE FOR DISTRIBUTED CONTROL TELECOMMUNICATION SYSTEMS

[75] Inventor: Douglas S. Sand, Naperville, Ill.

[73] Assignee: American Telephone and Telegraph Company, AT&T Bell Laboratories, Murray Hill, N.J.

[21] Appl. No.: 810,069

[22] Filed: Dec. 17, 1985

[51] Int. Cl.$^4$ .................. H04Q 3/47; H04Q 11/04
[52] U.S. Cl. .................................. 379/269; 370/58; 370/60; 379/289
[58] Field of Search .............. 370/60, 67, 66, 63, 370/58; 379/269, 274, 273, 221, 289

[56] References Cited

U.S. PATENT DOCUMENTS

| | | | |
|---|---|---|---|
| 3,643,032 | 2/1972 | Ulrich et al. | 379/269 |
| 4,322,843 | 3/1982 | Beuscher et al. | 370/63 |
| 4,421,955 | 12/1983 | Mori et al. | 379/269 |
| 4,484,324 | 11/1984 | Orsic | 370/58 |
| 4,530,051 | 7/1985 | Johnson et al. | 364/200 |
| 4,633,460 | 12/1986 | Suzuki et al. | 370/58 |
| 4,654,845 | 3/1987 | Mukerji | 370/58 |

OTHER PUBLICATIONS

"Small Exchange Applications With 5ESS-PRX," AT&T and Phillips Telecommunications, (Manufacturer's Brochure), 1985, pp. 1-9.

Primary Examiner—Thomas W. Brown
Attorney, Agent, or Firm—Werner Ulrich

[57] ABSTRACT

In a distributed processing telecommunication switching system comprising a plurality of switching modules, the individual modules control substantially all telephone call control processing actions, including the selection of an available port of a multiport hunt group, without requiring the assistance of a central processor. Each module includes a processor, a plurality of ports connected to customer lines and interoffice trunks, a plurality of outlets for setting up intermodule connections, and a switching network for interconnecting ports and outlets within a module. The module processors communicate with each other by a high speed common data communication facility connected to all processors. This data communication facility is used for communicating intermodule call control messages and port availability data to allow port hunts to be accomplished without using a central processor.

20 Claims, 12 Drawing Figures

PRIOR ART SYSTEM

ARCHITECTURE FOR DISTRIBUTED CONTROL TELECOMMUNICATION SYSTEMS

CROSS REFERENCE TO RELATED APPLICATION

This application is related to the application of J. L. Ho, Ser. No. 810,070, entitled "Resource Allocation In Distributed Control Systems" which application is assigned to the assignee of the present application and is filed concurrently herewith.

TECHNICAL FIELD

This invention relates to stored program controlled switching systems, and, more specifically, to apparatus and methods for distributed control telecommunication switching systems.

BACKGROUND OF THE INVENTION

Modern telephone switching systems have achieved flexibility through the use of program control wherein a processor system, under the control of a program stored in memory, controls the operations of the system. In order to be able to serve a very broad range of office sizes, many modern systems use the technique of distributed control in which the system use the technique of distributed control in which the system is broken down into a number of modules and each module is controlled by its own processor. In one such system using the technique of parallel distributed control, the 5ESS TM switch manufactured by AT&T Technologies, Inc., described U.S. Pat. No. 4,322,843 by H. J. Beuscher et al., each module processes all signals, associated with source and destination ports connected to customers or to trunks to other switches, of that module and handles all intramodule switching between ports connected to that module. In addition, this system also uses a central process or for handling a large class of call processing functions associated with intermodule calls or requiring the use of a data base, such as the relationship between directory numbers and ports, that is used by all modules.

In this system, the processors of the various modules communicate with each other via data messages transmitted over the switching network of the system to a message switch which then retransmits each message to the module for which that message was destined. Such an arrangement introduces considerable delay in the transmission of each message. The total delay which can be allowed in processing and responding to incoming signals, such as a customer answer, is limited in commercial telephone systems by telephone requirements according to international standards. Therefore, the number of such data messages which may be exchanged among modules in order to respond to customer requests is limited. This limitation helps to determine the assignment of functions to module processors and the central processor.

Because the central processor is used for performing many of the basic data processing functions required to set up each telephone call, it is necessary that a highly reliable central processor be available in each switch. Further, these substantial data processing requirements lead to the requirement of a processor having very high processing capability in order to handle to very large office. It is an objective of distributed control telephone switching systems to be able to grow readily, by the addition of individual switching modules, one module for each growth step, from a small size of one switching module serving perhaps 5,000 customers to sizes having many modules and serving in excess of 100,000 customers.

In summary, a problem exists in the prior art of parallel distributed processing telecommunication systems in that a reliable high-capacity central processor is required with substantial costly and complex common software resident in that processor to support a systems architecture for small switching offices while maintaining a capability of growing to a large office.

SUMMARY OF THE INVENTION

The foregoing problem is solved and a technical advance is achieved in accordance with the principles of the invention in an illustrative distributed control switching system comprising a plurality of switching modules that advantageously use a high-speed common data communication means to rapidly exchange call control messages such that call processing functions previously performed by a central processor are advantageously distributed to individual switching module processors. Advantageously, such an arrangement offers low interprocessor message latency permitting many more messages to be exchanged among module processors in order to set up a call than in a common prior art system. Advantageously, the presence of a high-speed common data communication means permits a module processor to query a data base stored in another module processor instead of requiring that data necessary for performing most data processing tasks be immediately accessible within a module processor. Such an arrangement also permits data to be broadcast to all switching modules of the system for rapidly transmitting the large amount of data required. These factors permit the migration of central processor call processing functions to the switching module processors. By focusing in the switching module processor all strategic control operations, a less expensive lower-capacity, lower-reliability central processor may be used. This substantially decreases the cost of a small office serving, for example, 5,000 lines with one switching module while still permitting such an office to grow to a very large size.

An exemplary parallel distributed control telecommunication switching system illustrating my invention has a plurality of switching modules and connection means for selectively setting up connections among ports and intermodule outlets of the switching modules. The system also includes a processor for controlling the connection means, and intermodule connection means for interconnecting intermodule outlets of different ones of the modules. The system further includes an administrative processor for communicating with a man-machine interface and a common data communication means for transmitting data packets among the module processors. The module processors communicate with each other via such data packets to cooperatively set up connections between ports on different modules substantially without the use of the administrative processor.

In one specific embodiment of the invention, a time multiplex switch is used as the means for selectively interconnecting the outlets of the different modules; in another specific embodiment, these outlets may be directly connected in groups between the modules. In either embodiment, the processor of the module containing the source port of a call sends data on intermodule outlet availability to the processor of the module containing the destination port of that call so that the two processors can cooperatively control the set-up of an intermodule path.

In accordance with the principles of my invention, a call between ports on different modules is set up as follows: a seizure of an incoming port by a line or an incoming trunk is detected and the directory number of the terminating party is collected. This process may be performed by monitoring the incoming port and connecting the incoming port to a receiver or it may be performed by receiving data messages from another switch over a common channel signaling facility. The destination directory number is then translated to find the identity of the destination port or the destination multiport group. In the latter case, an additional step is required to find an available port in the multiport group. Next, a message comprising one or more data packets is sent to the module processor of the destination port requesting that a connection be set up to that port. Finally, a message is sent from the module containing the destination port to the module containing the source port to complete the connection by setting up a connection between an appropriate outlet and the source port. Additionally, the interprocessor data messages identify available outlets of each of the modules and the modules cooperate to select an available outlet of each module for use in setting up the connection. If a time multiplex switching network is used for intermodule connections, an additional message including the identification of an available outlet is sent to that switching network to set up the required intermodule connection. Advantageously, no operations are required of the administrative processor so that all the call processing operations for this call are performed by the module processors.

In accordance with one specific embodiment of the invention, the administrative processor broadcasts data, such as initialization data, for example, or common program text, to all module processors requiring such data. Advantageously, such an arrangement and method permits rapid initialization of many module processors in parallel.

In accordance with one specific embodiment of the invention, a local area network which transmits data at a rate of ten megabits/second and uses carrier sense multiple access/collision detection, is used to interconnect the module processors. Advantageously, the use of such a network implies a transmission time that, even for a relatively long 100 byte message, is less than 0.1 milliseconds; in contrast, a similar message sent over a 64 kilobit/second channel through a time division network, would encounter a transmission delay in excess of twelve milliseconds.

Conventionally, trunks interconnecting a given pair of switches are grouped; when a trunk for a switch to a specific destination is required, an available member of the appropriate group is hunted. Similarly, lines to a private branch exchange (PBX), for example, of a business, are grouped into multiline hunt groups. More generally, multiport hunts must be executed to find an available port connected to a member of the line group or trunk group. In the system described in the previously cited Beuscher patent, port hunting is performed by the central processor. For implementing the method and apparatus for this specific embodiment of the invention, each port group has an associated data base which retains the current state of activity of each port in the group; this associated data base is maintained by a hunting module for that group. Any calls originating in other modules that require the use of a port in the group require that a message be sent to the hunting module to select an available port. Advantageously, such an arrangement can avoid dependence upon a highly reliable central processor complex for performing port hunting, a call processing step that must be executed for any outgoing call, tandem call, or call to a multiline group.

BRIEF DESCRIPTION OF THE DRAWING

The invention will be better understood from the following detailed description when read with reference to the drawing in which.

DETAILED DESCRIPTION

Figure 1:
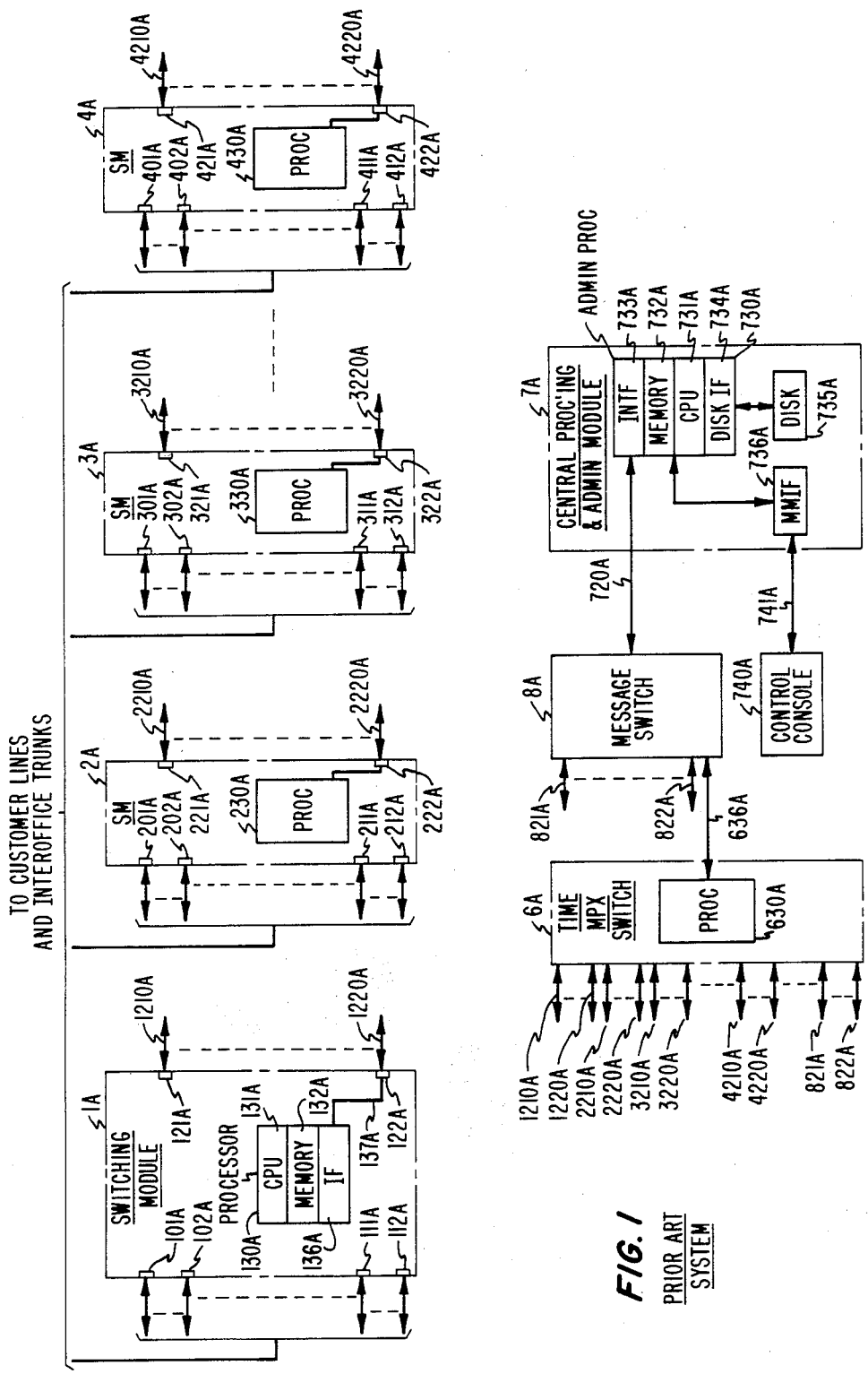
FIG. 1 is a block diagram of the prior art distributed processing telecommunication switching system including a plurality of switching modules.

FIG. 1 shows a prior art distributed processing telecommunication switching system similar to that described in more detail in the previously cited Beuscher patent. The system includes switching modules 1A, 2A, 3A, ..., 4A each of which includes ports for connection to lines and trunks, and intermodule outlets for setting up intermodule paths. For example, ports 101A, ..., 102A; ...; 111A, ..., 112A and intermodule outlets 121A, ..., 122A are shown for switching module 1A. While individual ports and outlets are shown, some of the ports, connected to pulse code modulation (PCM) facilities, and all of the outlets are grouped on time multiplex facilities where one facility can carry many simultaneous voice or data channels. This applies also to the systems shown in FIGS. 2 and 3.

The intermodule outlets of each of the switching modules 121A, ..., 122A; 221A, ..., 222A; 321A, ..., 322A; ...; 421A, ..., 422A are connected via paths 1210A, ..., 1220A; 2210A, ..., 2220A; 3210A, ..., 3220A; ...; 4210A, ..., 4220A to time multiplex switch 6A. The time multiplex switch can set up connections between any pair of these outlets from different switching modules. An intermodule connection between two ports connected to different modules is formed by a connection in time multiplex switch 6A between two intermodule outlets and intramodule connections between each of these two intermodule outlets and one of the two ports.

Also connected to the time multiplex switch via data channels 821A, ..., 822A is a message switch 8A. Message switch 8A also receives data from a central processor and administrative module 7A over data channel 720A, and from the processor 630A of time multiplex switch 6A over data channel 636A. The message switch 8A can set up data connections between any of its inputs and any of its outputs.

The central processor and administrative module 7A includes a processor 730A comprising a central processing unit (CPU) 731A, memory 732A, data interface 733A for communicating with message switch 8A, and a disk interface 734A for communicating with a disk 735A. The processor communicates with a man-machine interface 736A for communicating via data path 741A with control console 740A.

Each switching module has its own processor. Processor 130A for switching module 1A comprises a central processing unit 131A, memory 132A and an interface 136A for communication via data path 137A with one of the intermodule outlets of switching module 1A such as outlet 122A. Those outlets which are used for communicating with the processor are also switched through time multiplex switch 6A to message switch 8A. Thus, the processors of the different switching modules communicate with each other and with the central processor and administrative module via data channels connected to time multiplex switch 6A and thence via data channels 821A, . . . , 822A to message switch 8A. The data rate for these data messages sent as data packets, is the same as the data rate for inter-customer communication. For this system, this data rate is the standard 64 kilobit/second rate characteristic of the commonly available pulse code modulation (PCM) voice communication systems.

Using such data channels, a 100 byte data packet incurs a delay of over 12 milliseconds to reach the message switch and if the message is destined for another switch module incurs another 12 millisecond delay to reach that second module. In practice, the delay is significantly longer because additional delays are encountered in the message switch itself and because the processors are usually not ready immediately to process a received message. In the case of the prior art system of FIG. 1, the delay in sending a message between two modules and responding in the destination module to that message is 60 milliseconds minimum and the delay in sending a message between a module and the central processor and responding to that message is 30 milliseconds minimum. In the prior art system the number of messages which can be exchanged between modules and between modules and the central processor and administrative module is limited by these long delays.

The allocation of processing tasks among the switching module processors 130A, 230A, 330A, . . . , 430A and a central processor 730A is to a considerable extent determined by the timing restrictions associated with exchanges of messages among the modules and between the modules and the central processing module. International standards have set a requirement that the cross-office delay across a telecommunication switch is limited to 180 milliseconds average. This requirement states that from the time a switch receives a request for a connection until that connection is set up, no more than 180 milliseconds average may elapse. With this timing requirement, and allowing for data processing actions in response to received data messages it is apparent that the software structure of the prior art system of FIG. 1 can permit only two messages between a switching module and the central processor plus one message between the originating and terminating switching modules for processing an intermodule connection if these messages provide data for sequentially executed processing actions. To minimize intermodule messages, consistent with this limitation, essentially the entire dynamic intermodule data base, i.e., that portion of the data base which changes as calls are set up and disconnected and which contains data concerning more than one switching module, is maintained in a central processor; the central processor performs essentially all processing functions requiring access to that data base.

The dynamic intermodule data base includes three elements which are required for the setup and disconnection of the bulk of telephone calls. These are the routing, trunk assignment, and path assignment data bases. The routing data base is that data base which is used to select a particular outgoing interoffice trunk group for an outgoing or tandem call, the trunk data base is used for selecting an idle trunk in a group and for maintaining a list of idle trunks, and the path assignment data base is used for selecting a path to interconnect two modules. In a system in which a central processor maintains these data bases, the central processor executes the routing, trunk assignment and path selection processes. Such an arrangement advantageously minimizes the number of messages which must be exchanged among different processors. However, the arrangement disadvantageously creates a bottleneck limiting the size of the system by the capabilities of the central processor and limits the reliability of the system because of the need for a common reliable facility. If these processes are to be allocated to the switching module processors of the parallel switching modules instead of the centralized processor, it is necessary to exchange more data among these processors since none can maintain the entire data base required for setting up its portion of all calls handled by that module. Advantageously, allocating these processes to the switching module processors assures that there is less dependence on a single central processor and that the ultimate size of any switch is not limited by the capability of any such central processor.

Figure 2:
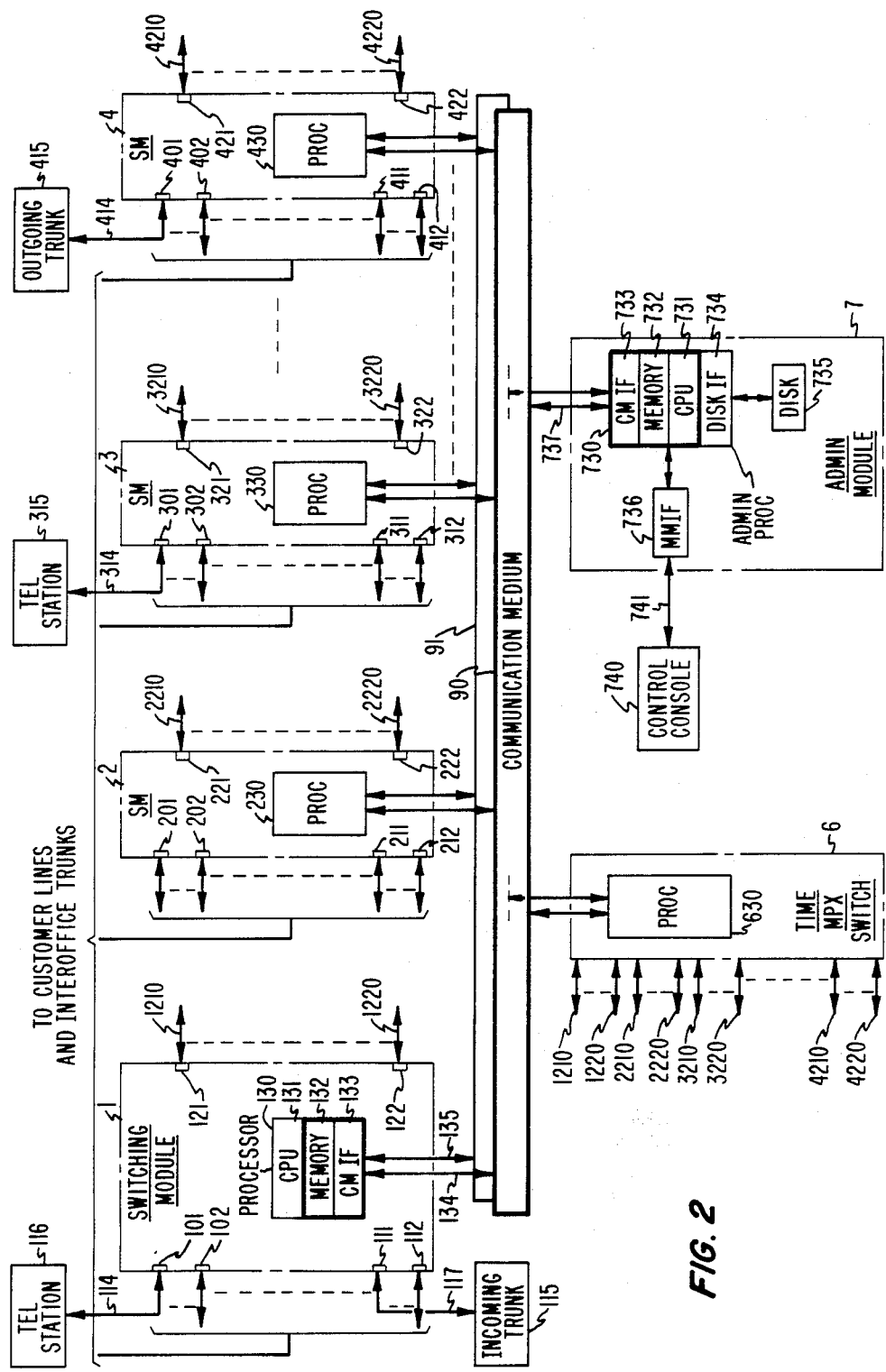
FIGS. 2 and 3 are alternative embodiments of a distributed processing telecommunication switching system, each including a plurality of switching modules, that operate in accordance with the present invention.

FIG. 2 shows an exemplary embodiment of a system adapted for operation in accordance with the principles of the present invention. The interface, such as interface 136A (FIG. 1), to data channels for communicating over the outlets of each switching module for communicating messages between module processors has been replaced by a communication medium (CM) interface such as CM interface 133 (FIG. 2) for accessing a common data communication medium 90. This common data communication medium, being separate from the customer communication system, can be operated at a different rate, in the exemplary embodiment, at 10 megabits per second. The data communication system includes the communication medium and the CM interfaces. The high data rate communication medium allows many messages to be transmitted within a short period. A data ring, which maintains the ordering of packets, could also be used as a common communication medium, even though different packets are being transmitted concurrently in different segments of the ring. Substantially all functions necessary for setting up intermodule connections are carried out by the module processors working in cooperation with each other and exchanging data over the communication medium, without the need for data processing operations carried out by the administrative processor 730. (An exception would be the generation of data for a test connection requested by the administrative processor.) The high data rate common communication medium makes it possible to exchange many more data messages between processors in order to set up a connection, thus removing a constraint which, in the prior art system of FIG. 1, required that many data processing functions be carried out by a central processor. Data messages are used, for example, to transmit data to allow a cooperative process for selecting available outlets for use in a path between two switching modules or to access data in the memory of another processor.

FIG. 2 shows four typical switching modules, 1,2,3, . . . , 4 representing four of the switching modules of a typical switch. Also shown are a time multiplex switch 6 and an administrative module 7. Switching modules 1,2,3, . . . , 4, time multiplex switch 6 and administrative module 7 are all connected to common data communication medium 90. Each of the switching modules are switching modules of the type described in the previously cited Beuscher et al. patent. Switching module 1 is connected to ports 101, . . . , 102; . . . ; 111, . . . , 112; each group of ports is connected to a group of lines or interoffice trunks. (Such a group of trunks is not a trunk group as the term is commonly used and used herein.) Switching module 1 also is connected to a group of intermodule outlets 121, . . . , 122. Switching module 1 is controlled by switching module processor 130 comprising CPU 131, memory 132, and communication medium (CM) interface 133 for interfacing with communication medium 90. Switching modules 2,3, . . . , 4 have corresponding processors 230,330, . . . , 430, respectively, groups of ports (201, . . . , 202; . . . ; 211, . . . , 212), (301, . . . , 302; . . . ; 311, . . . , 312), . . . , (401, . . . , 402; . . . ; 411, . . . , 412), respectively, connected to lines and trunks, and groups of intermodule outlets 221, . . . , 222), (321, . . . , 322), . . . , (421, . . . , 422), respectively.

In addition, the illustrative embodiment of FIG. 2 includes a time multiplex switch 6 which is connected to the intermodule outlets of all the switching modules. This time multiplex switch makes connections among such intermodule switching facilities in order to set up a path between ports on two different switching modules. Time multiplex switch 6 also includes a processor 630 for setting up and tearing down connections in the switch. The intermodule outlets from switching modules 1,2,3, . . . , 4 are connected to the time multiplex switch by paths (1210, . . . , 1220),(2210, . . . , 2220), (3210, . . . , 3220 , . . . , (4210, . . . , 4220 , respectively. The illustrative embodiment of FIG. 2 also includes an administrative module 7 comprising a processor 730 and a bulk storage disk 735. The processor has a central processing unit 731, local memory 732, CM interface 733 for communicating with communication medium 90, and disk interface 734 for communicating with the disk 735. The processor communicates with man-machine interface 736 for communicating via data path 741 with a control console 740. The disk is used for storing initialization data such as the program text required in processors 130, 230, 330, . . . , 430 and 630, to control switching modules 1,2,3, . . . , 4 and time multiplex switch module 6, respectively. The control console is used for displaying maintenance and administrative data to and for accepting input data and control messages from an operations or traffic control craftsperson or supervisor.

To enhance the reliability of the data communication facility, a duplicate communication medium 91 is provided, and each processor is provided with access to both of the communication media 90 and 91. For example, CM interface 133 of processor 130 of module 1 has access to communication medium 90 via data path 134 and has access to duplicate communication medium 91 via data path 135. Such an arrangement permits the system to survive the failure of either communication medium or a failure which causes one of the communication medium interfaces to place a short circuit across one of the media.

Briefly, the system works as follows: A telephone subscriber such as telephone station 116 connected by path 114 to port 101, or an incoming trunk such as 115 connected by path 117 to port 111, both ports on switching module 1, sends an origination signal by lifting the handset from the cradle or, in the case of an incoming trunk, a seizure signal by applying, removing, or reversing a voltage to the port. Under the control of the switching module processor, such as processor 130, the directory or destination number of the destination telephone subscriber is received via the port and accumulated in the processor 130. In the case of the well-known technique of common channel signaling, seizure and number signals are sent over a separate data channel and may be received in a different module; that module sends a message comprising the received data to the module containing the trunk port.

When a full directory number has been received, the number is translated to find the identity of a destination port for communicating with the destination customer. The translation may be carried out in the module processor, or a preliminary translation may be made in that processor to select an appropriate translating processor which will make the translation. If the call can be set up within the module no further communication with other modules is required. If the call is routed via a port of another module, data messages are sent via data communication medium 90 to the other modules involved and the call is set up cooperatively between the incoming or originating (source) module and the outgoing or terminating (destination) module. A message is also sent to the time multiplex switch to set up the connection between outlets of the source and the destination modules. In accordance with the teachings of the present invention, the intervention of the administrative module 7 is not required. This is made possible by retaining an appropriate up-to-date data base in each module and by sending cell control messages between the modules. As illustrated further in FIGS. 8–11, a plurality of data messages among the switching modules transmit all data needed to complete the calls.

Figure 3:
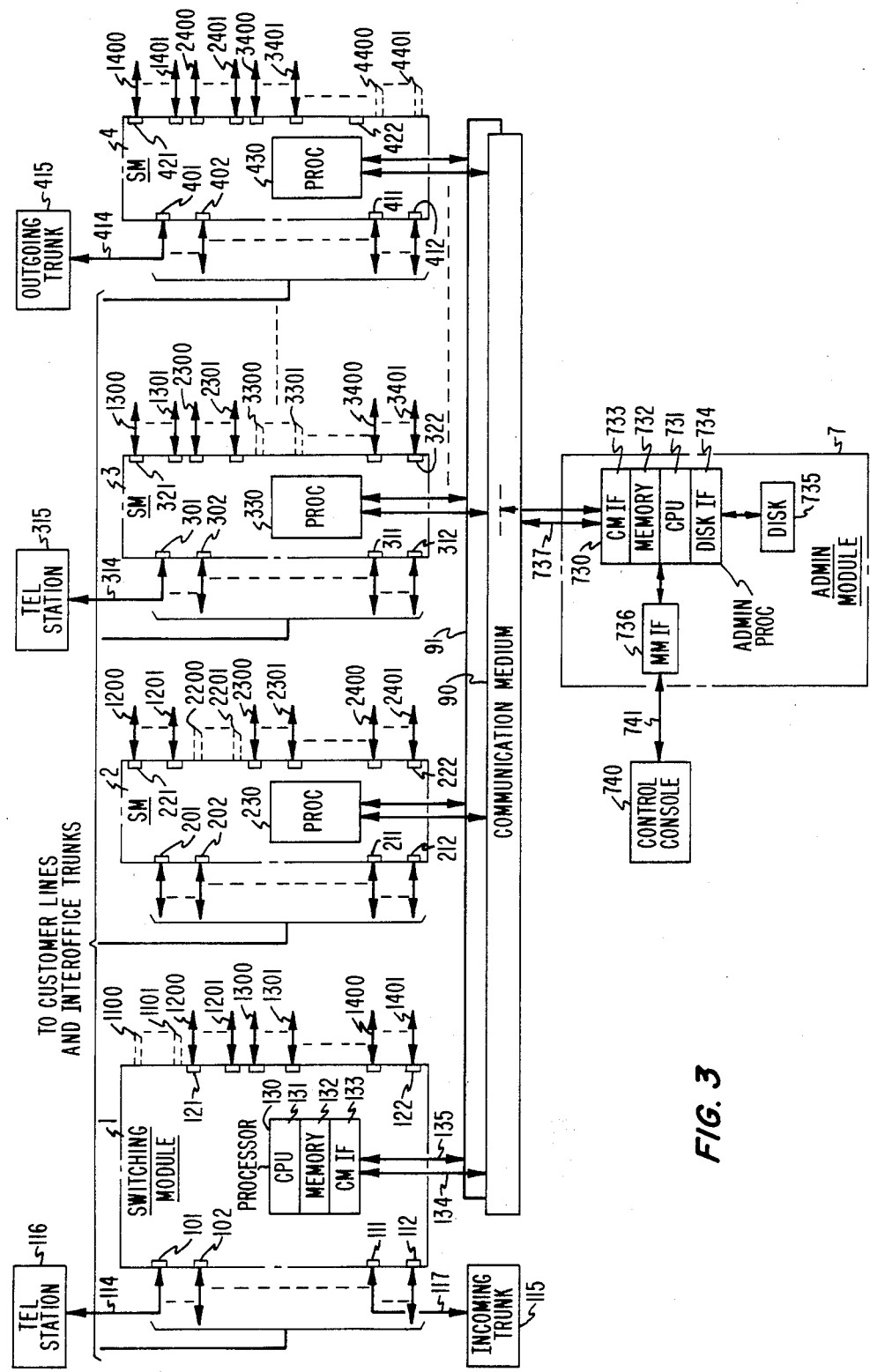

The alternative illustrative embodiment of FIG. 3 is similar to that of FIG. 2 except that no time multiplex switch is required. Instead the switching modules are directly interconnected via their intermodule outlets. While this arrangement is meant primarily for use in smaller offices, it can also be used in larger offices with the occasional use of one switching module to make a tandem connection between two other switching modules. If switching modules are to be fully interconnected without an intermediate switch such as time multiplex switch 6, the size of the intermodule outlet group interconnecting any two modules in a large system may not be large enough to act as an efficient outlet group; some additional overflow arrangement such as intermodule tandem switching is required.

Each switching module of the system of FIG. 3 has the same outlets as in the system of FIG. 2. Modules 1,2,3, . . . , 4, have outlets (121, . . . , 122),(221, . . . , 222),(321, . . . , 322), . . . , (421, . . . , 422), respectively. However, the paths connected to intermodule outlets are connected to other outlets, not to a time multiplex switch. In FIG. 3, the paths between intermodule outlets are numbered such that the first digit represents the number of one of the modules connected by an outlet, the second digit represents the other module. In order to use the same designation for both ends of an intermodule path, in FIG. 3 the rule is used that the first digit of the number of a path is always equal to or less than the second digit. No intramodule paths are needed since the internal switch of each module can set up an intramodule connection between two ports of the module. The missing intramodule outlets for modules 1;2;3; . . . ; 4, are shown graphically by dashed lines representing the internal equivalent of intramodule paths and labeled 1100, . . . , 1101;2200, . . . , 2201;3300, . . . , 3301; . . . ; 4400, . . . , 4401, respectively. FIG. 3 shows modules 1,2,3, . . . , 4, with paths and dashed lines [1100, . . . , 1101;1200, . . . , 1201;1300, . . . , 1301; . . . ; 1400, . . . , 1401], [1200, . . . , 1201;2200, . . . , 2201;2300, . . . , 2301; . . . ; 2400, . . . , 2401], [1300, . . . , 1301;2300, . . . , 2301;3300, . . . , 3301; . . . ; 3400, . . . , 3401], . . . , [1400, . . . , 1401;2400, . . . , 2401;3400, . . . , 3401; . . . ; 4400, . . . , 4401], respectively. For example, module 2 has paths 1200, . . . , 1201 connected to module 1; dashed lines 2200, . . . , 2201 representing the unneeded intramodule paths of module 2; paths 2300, . . . , 2301 connected to module 3; . . . ; and paths 2400, . . . , 2401 connected to module 4.

In the systems of FIGS. 2 and 3, each module processor executes a program called an operating system. Operating systems are well known in the art. One such system is the Duplex Multi-Environment Real Time (DMERT) operating system, described in Grzelakowski et al.: "DMERT Operating System", *Bell System Technical Journal*, Vol. 62, No. 1, Part 2, January 1983, pp. 303–322. Among the functions executed under the control of an operating system are those of transmitting messages, receiving messages, and associating received messages with a process block for controlling a process such as a telephone call. When a process resident in one processor reaches a stage where it must communicate with another processor, it does so by generating a message comprising one or more data packets to that other processor. The messages are transmitted under the control of the operating systems of the sending and receiving processors. Each packet includes its own process identification and, if known, the identification of the process executing in the other processor with which communication is desired. The interplay of processes and messages is illustrated further in FIGS. 8–11.

The general process of choosing a trunk for an outgoing or tandem call will now be briefly described. The choice comprises a routing stage for selecting a trunk group and a trunk hunting stage for selecting a trunk within that group. All member trunks of a trunk group have a common destination, so that a process for routing telephone or data traffic need only be concerned with the choice of trunk groups. A routing process normally finds a preferred choice trunk group and provides an alternate route trunk group in case all trunks in the preferred group are busy. A well-designed routing process, however, needs to provide the flexible type of first choice and alternate routing available in present day telecommunication switches such as the 4ESS TM switch manufactured by AT&T Technologies, Inc. In such switches, different first choice and alternate routes may be selected according to the traffic conditions existing at a particular time. In some cases, the alternate routing can be further modified by input from the traffic supervisor so that the system may respond properly to emergency conditions (such as the outage of a large number of trunks or the existence of an emergency which causes a large amount of traffic to be generated from and to one destination) or for special traffic conditions such as those which exist on Mother's Day. In order to control routing in an optimal way, it is desirable that the routing control for any given destination be under the control of a single data base. Because of the highly dynamic nature of the traffic it is further desirable that, as a minimum, the control for routing for all related traffic be maintained by a single processor.

Once a route, hence, a trunk group has been selected, a trunk within that trunk group can be selected by a separate trunk hunting process. However, the choice of an available trunk must be made in such a way that the trunk is not simultaneously seized by two switching modules processing different calls. This suggests the use of a single data base for each trunk group, or, as discussed with respect to FIG. 11, the use of a data base replicated in and constantly updated for each module.

The process of setting up an intermodule path will be discussed briefly. Two kinds of problems exist in the selection of a path between two modules. If the paths between the two modules are direct, i.e., without including a stage of switching, then it is only important that two modules connected by a path do not simultaneously seize the two ends of a path for different calls. In order to choose a path, the processor which makes the path selection must have a knowledge of the availability of both ends of at least a subset of the paths connecting the two modules. If a stage of switching is involved and, as is most common in present switching systems, this stage of switching is a non-blocking time multiplex space division switch, then it is necessary that the two modules being interconnected both have the same time slot available for a given call; it is also necessary to ensure that the same time slot is not simultaneously seized by the two modules for different calls. For this path selection process, the processor that makes a decision as to which path is to be used must have knowledge of at least a subset of the available time slots of each of the modules involved in the connection.

Figure 4:
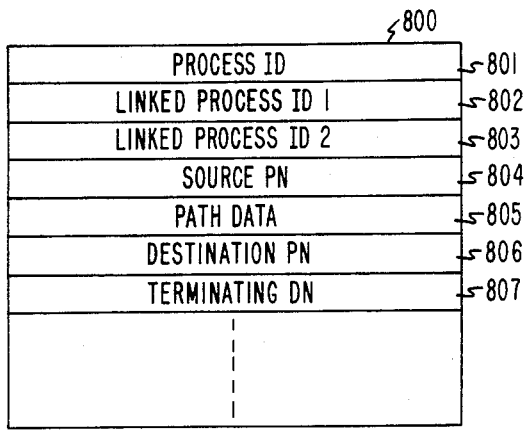
FIGS. 4–7 are layouts of memory used in the switching systems for controlling the setting up of calls and hunting for available trunks.

FIG. 4 is an illustrative memory layout of a process block 800 which contains information necessary to control the actions of one switching module for one call. The process block 800 includes a process identification number 801 which is used to identify the call and which is used to link any incoming messages to that process block. Process block 800 also contains the identifications 802,803 of processes that are linked to this process either within the module or in outside modules. The process block 800 further contains the identifications of the source and destination ports 804,806 used in a call and the path data 805 for the connection set up either within a module or between modules to connect such ports. The process block 800 also includes the directory number 807 of the terminating customer.

Figure 5:
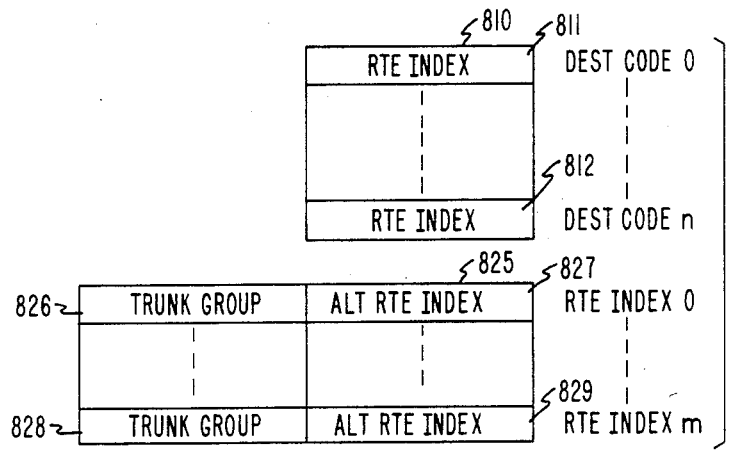
Figure 6:
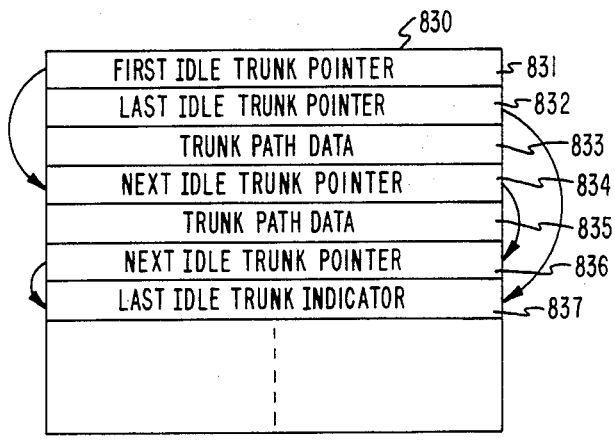
Figure 7:
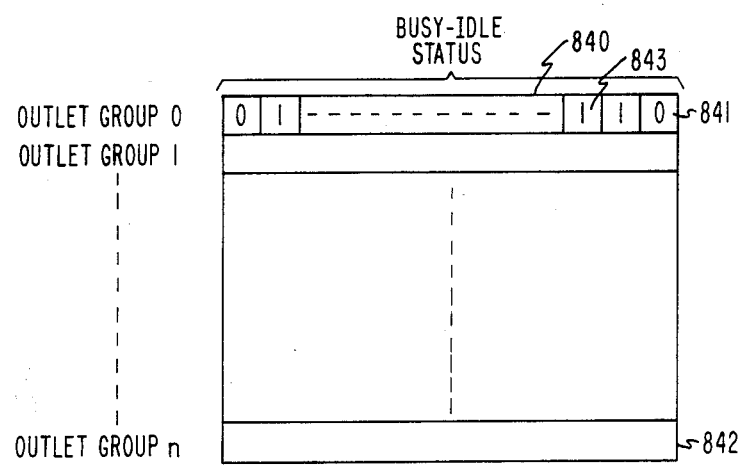
Figure 8:
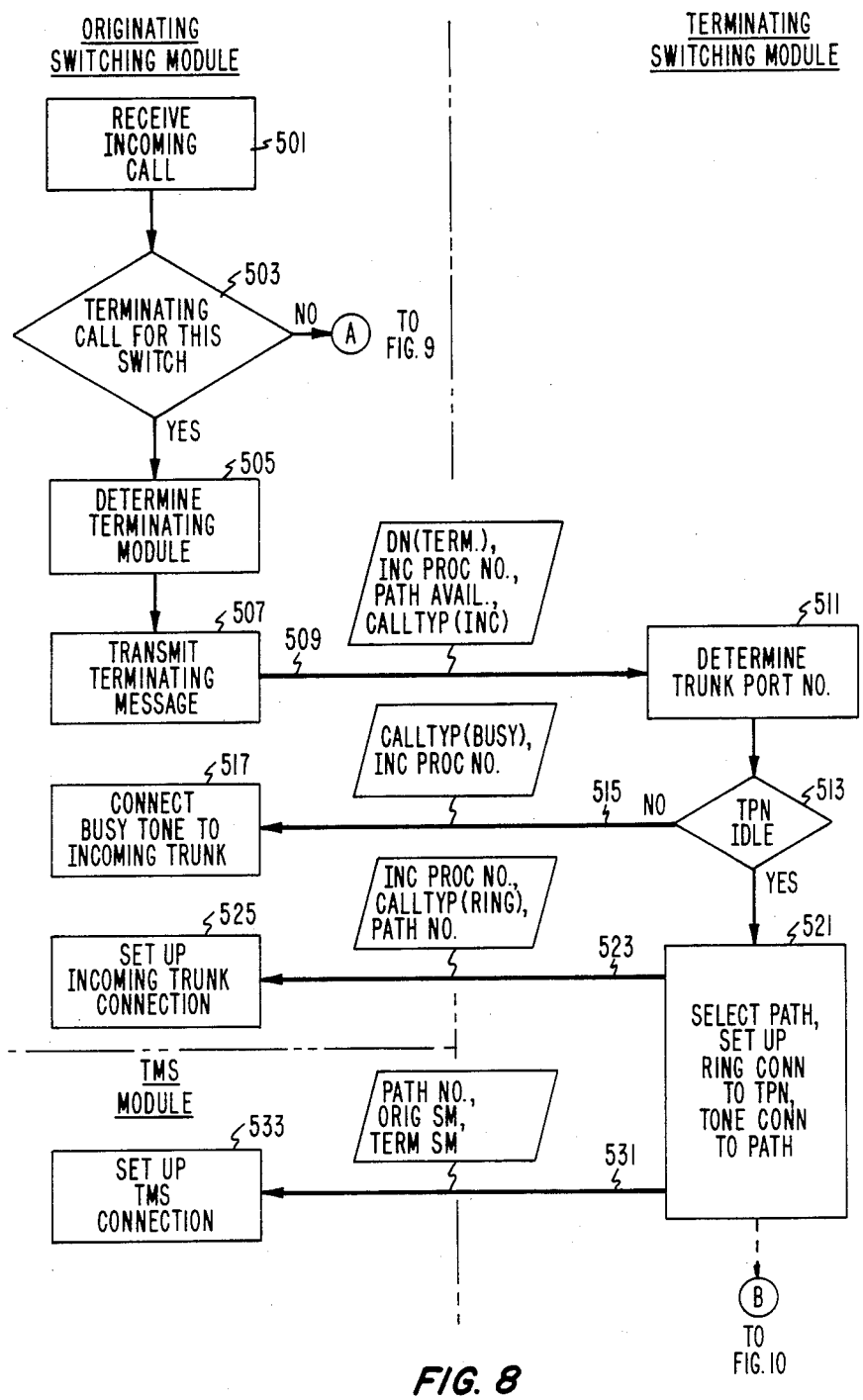
FIGS. 8–11 are combined flow and message exchange diagrams for controlling the set up of a telephone call and for controlling the selection of an available trunk.

FIGS. 5–7 show further illustrative memory layouts for controlling telephone calls. FIG. 5 is a layout of memory used for routing. Each destination subscriber directory number or destination number includes an area code or office code, referred to herein, for convenience, as a destination code. Each destination code has an associated route index, one of the n+1 route indexes 811, . . . , 812 of table 810. Many destination codes may share a route index; for example, this is likely to be the case if the destination codes sharing a route index are all for subscribers connected to the same switch. Each route index is associated with one of the m+1 entries in table 825; each such entry comprises a primary trunk group, 826, . . . , 828, and an alternate route index 827, . . . , 829. A route index may also indicate an intraswitch destination by a special value, representing an intraoffice destination code, for the "primary trunk group." When a route index has been found a search is first made for an available trunk in the primary trunk group. If no idle trunk is available in the primary trunk group, then the alternate route index is used to obtain a new primary choice trunk group and a new alternate route index. The final alternate route index will be that of an overflow tone or of an announcement indicating that no facilities are available for communicating with the destination switch. Such routing is well known in the prior art and is described, for example in W. Ulrich et al.: "Translations in the No. 1 Electronic Switching System", *Bell System Technical Journal*, v. 43, no. 5, part 2, September 1964, pp. 2533–2573, esp. pp. 2542–2545, and in T. V. Greene et al.: "Network Management and Administration", Bell System Technical Journal, v. 56, no. 7, September 1977, pp. 1169–1202.

FIG. 6 is a layout of a memory block 830 used for selecting an idle trunk in a trunk group. The first two slots of this memory contain a pointer to the first idle trunk 831 (i.e., the trunk which has been idle the longest) and the last idle trunk 832 (i.e., the trunk which was most recently used). In addition, there is one entry per trunk such as 833,834,835,836, and 837, which either comprises data concerning the current use of the trunk or comprises a pointer to the next most idle trunk. Entries such as 833 and 835 for busy trunks comprise path data for that trunk. The idle trunks, represented by memory entries 834,836,837, are linked together in a list each pointing to the next most idle trunk. The last idle trunk entry 837 has no pointer but a special indication to indicate that there are no further idle trunks. When an idle trunk is needed, the first idle trunk is seized; then, the identity of the next idle trunk, found in the information slot associated with the trunk being seized, replaces the information in the first idle trunk slot of the trunk group information. When the trunk marked "last idle trunk" is seized, a special indication is placed in the first idle trunk pointer indicating that no trunks are available. When a trunk is released, the contents of the last idle trunk pointer are used to find the previous last idle trunk and that trunk is then linked to the trunk which was just released. The trunk which was just released is marked "last idle trunk", indicating that there are no further idle trunks, and its identity is placed in the last idle trunk slot. Line hunts can be performed in the same way as trunk hunts.

FIG. 7 shows a layout 840 of memory used to find available paths between a switching module and other switching modules. For the system of FIG. 3, intermodule outlets are grouped, in groups 841, . . . , 842 each group containing outlets to one other switch module. For example, group 841 may represent channels between modules 1 and 2. If a time multiplex switch is used, any outlets may be used for connection to any other module, so that a group need not be tied to a particular module. For each outlet, a busy-idle indication 0 or 1 is maintained in a bit position such as 843, to represent the state of a corresponding channel.

FIGS. 8–11 are a combination of flow diagram and message exchange diagrams illustrating the processing of an incoming telephone call. Processing steps are shown in columns under the caption of the module processor performing the processing steps. Processors are identified according to their use in the illustrative telephone call. Messages are shown as heavy lines interconnecting boxes in columns of the processor sending the message and the processor receiving the message. The content of the message, where not obvious, is shown in a parallelogram associated with the heavy line.

An originating call is one which originates from a subscriber connected to this switch. An incoming telephone call is a call originated by a subscriber connected to another switch, which has been connected by an incoming trunk to this switch. The actions for incoming and originating calls are very similar; the primary differences are that for an originating call the signals are sent to and received from an originating subscriber whereas for an incoming call, the signals are sent to and received from another switch. An incoming call from an incoming trunk 115 connected port 111 on switching module 1 to a customer telephone station 315 connected by line 314 to port 301 on switching module 3 will be illustrated first. A tandem call from trunk 115 that is routed to outgoing trunk 415 connected by path 414 to port 401 on switching node 4 will also be illustrated.

The incoming call is received in the incoming switching module (action box 501). When the call is detected, a process block 800 is set up for processing the call by the operating system of processor 130. A similar process block is subsequently set up in a destination module when the appropriate message 509 or 561 is received. The incoming switching module controller, switching module processor 130 of switching module 1 in the exemplary call, tests whether the call terminates in this switch or in another switch (test 503). This test is based on the destination code. If it is determined that this call terminates in this switch then a translation is made to determine the terminating module (action box 505). In the illustrative terminating call, this is assumed to be module 3. A message 509 is sent to that terminating module processor by action box 507. The text of the message 509 includes the destination number, the incoming call process number assigned to the call by the incoming switching module 1, a summary of path availability between the incoming and terminating switching modules obtained from memory block 840 of processor 130, and the type of message being sent. This message is received by the terminating switching module processor 330 which then translates the destination number which was received in the message to find the corresponding terminating port number 301. The terminating switching module processor 330 tests the terminating port to see if it is idle (test 513). If the terminating port is not idle then message 515 including a call type (in this case busy) and the incoming process number is sent back to originating switching module processor which (action box 517) connects busy to the incoming trunk attached to port 111 to inform the originating customer that the terminating customer is busy.

If the terminating equipment number is idle then terminating switching module processor 330 selects a path, from among those listed as being available in the received message, that is available in the terminating switching module, and sets up a ringing connection to the terminating customer and a tone connection to the path leading to the incoming customer (action box 521). The path is selected using memory block 840 of processor 330, and the received path availability data. The terminating switching module processor 330 then sends message 523 over the communication medium 90 to the incoming switching module processor 130. Message 523 includes an identification that includes the incoming process number, a message type indicating that a ringing connection has been set up, and the path number chosen for the eventual talking connection and the connection to send audible tone back to the originating customer. The incoming switching module processor 130 in response to reception of this message sets up a connection from port 101 of the incoming trunk to the intermodule outlet identified by the path number received in the message (action box 525).

In the embodiment of FIG. 2, the terminating switching module processor 330 also sends message 531, including the identifications of the originating and terminating switching modules and the selected path to the time multiplex switch module processor 630. In response (action box 533), the time multiplex switch module 6 under the control of processor 630 sets up a connection between the selected outlets to the incoming switching module 1 and the terminating switching module 3.

Subsequently, when answer by the terminating customer is detected (FIG. 10, action box 541) the terminating switching module 3 under the control of processor 330 sets up the talking connection and sends message 545 to the incoming switching module processor 130 (action box 543). Message 545 includes the incoming process number and the type of call action requested, in this case, to transmit an answer signal to the switch at the other end of the incoming trunk connected to port 111. In response, the incoming switching module processor 130 changes its call record to indicate that the call is in the talking state (action box 547), and sends the answer signal over the incoming trunk.

Return now to test 503 (FIG. 8) for checking whether the terminating call was destined for the customer connected to this switch or to another switch. If the result of test 503 indicates that this call does not terminate on this switch, then the call is a tandem call in which this switch is neither the originating nor the terminating but an intermediate switch. The incoming switching module transmits a tandem message 553 to a routing switching module (action box 551). In this example, module 2 is the routing switching module, and processor 230 executes the routing process. The message 553 contains a destination directory number representing the number dialed by the originating telephone subscriber and an incoming process number to identify the call. The message also contains the call type indicating that this is a tandem call. Upon receipt of the tandem message, routing switching module processor 230 determines an appropriate trunk group to be used for this call (action box 555). Processor 230 then sends a trunk hunt message 557 to a trunk hunt switching module, assumed in this example to be switching module 3. The trunk selection message again comprises the incoming process number to identify the call, the destination number, and a trunk group. Upon receipt of the trunk hunt message, trunk hunt switching module processor 330 selects an idle outgoing trunk (action box 559) and sends to the switching module containing this trunk a tandem completion message 561 which includes a trunk number, type of call, and the incoming process to identify the call. Assume that the selected trunk is outgoing trunk 415 connected to port 401 of module 4. Upon receipt of this tandem completion message, terminating switching module processor 430 controls the sending of the destination number over the selected outgoing trunk 415 connected to port 401 and generates a path availability message 565 to incoming switching module 1 (action box 563). Again, this path availability message includes the incoming process number as an identification. Upon receipt of this path availability message, incoming switching module processor 130 selects a path and sets up an internal connection in switching module 1 between the incoming trunk 117 connected to at port 111 and the intermodule outlet of the selected path. Incoming switching module processor 130 then sends a message 569 including the selected path number and the incoming process number as identification to the terminating switching module 4 so that the terminating switching module can set up its internal connection between its intermodule outlet and port 401 connected to outgoing trunk 415 (action box 571).

In the embodiment of FIG. 2, the incoming switching module processor 130 also sends a message 573 to the time multiplex switch module processor 630 containing an identification of the path and the originating and terminating switching modules. In response to this message, the time multiplex switch module processor 630 controls the setting up of a connection in time multiplex switch 6 between the selected links to the incoming module 1 and terminating module 4 (action box 575).

Figure 11:
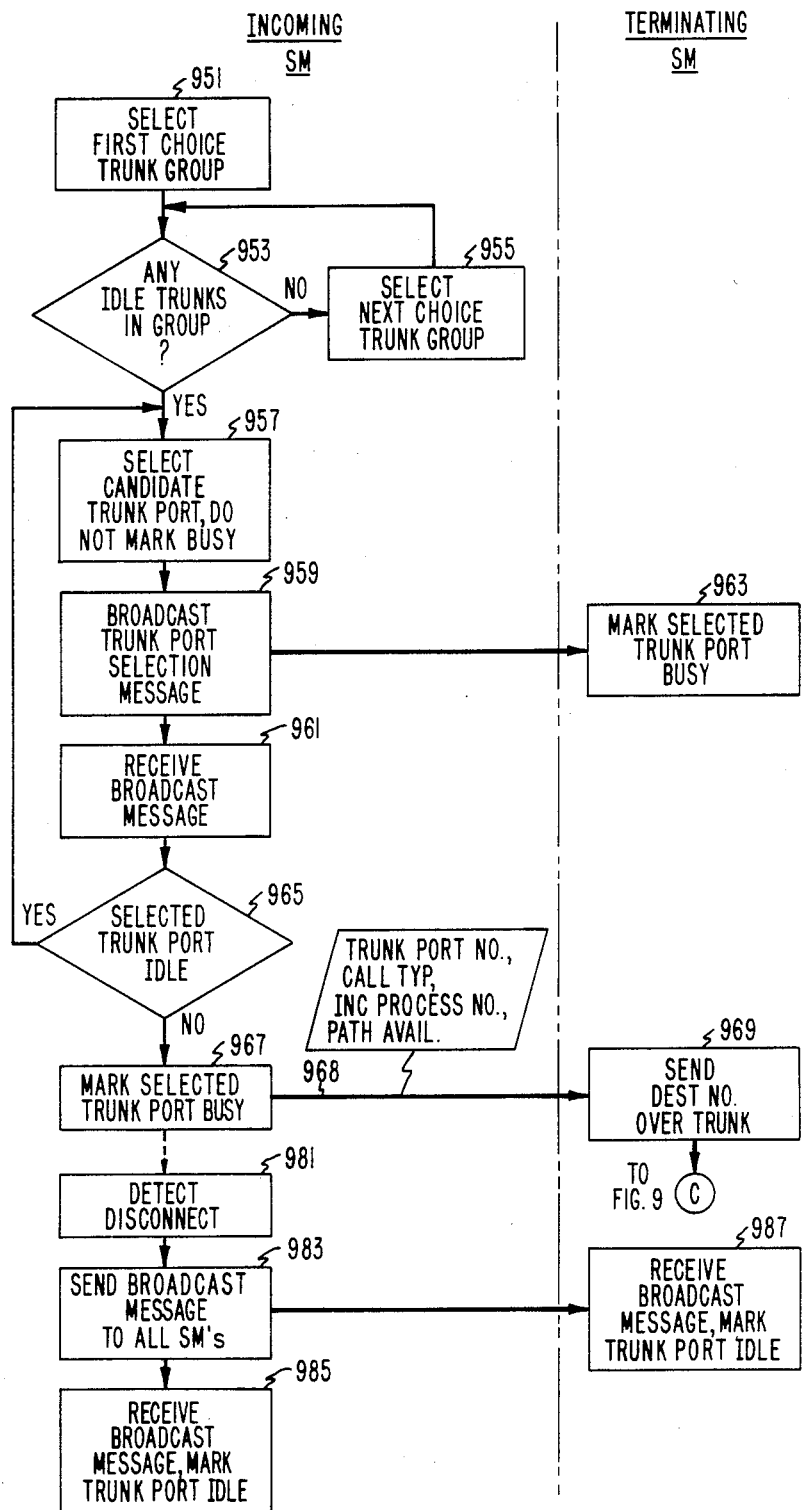

It is also possible to use the broadcast facilities of the common data communication medium to select trunks by an alternate method. This is illustrated in FIG. 11 which is entered at the time that a decision has been made that an outgoing trunk is necessary. In this method, the routing is performed in each switching module. This is reasonable since as discussed below, all switching modules have a complete record of availability of trunks. The incoming switching module first selects a first choice trunk group (action box 951); it does so by selecting a preferred route through the selection of a route index, based on the destination code, as discussed earlier. The route index also gives an alternate route index which allows the alternate routing procedure described below to be invoked. Each switching module has complete data on availability of all trunks. The incoming switch module then makes a test 953 to see if there are any idle trunks in the group being tested. If not, then the next choice trunk group is selected (action box 955) by identifying the trunk group specified by reading the contents of routing memory indicated the alternate route index; the routing memory contents will also provide an additional alternate route index in case this test should also fail. Following the selection of the next choice trunk group, a test is again made (test 953) to see if any idle trunks are available in the group. Eventually, a group will be tested which does have idle trunks. (Not shown is the case in which no trunks are available; in that case, the last alternate route index is an indication that the customer should have overflow tone returned from the incoming or originating switching module to that customer.)

Figure 9:
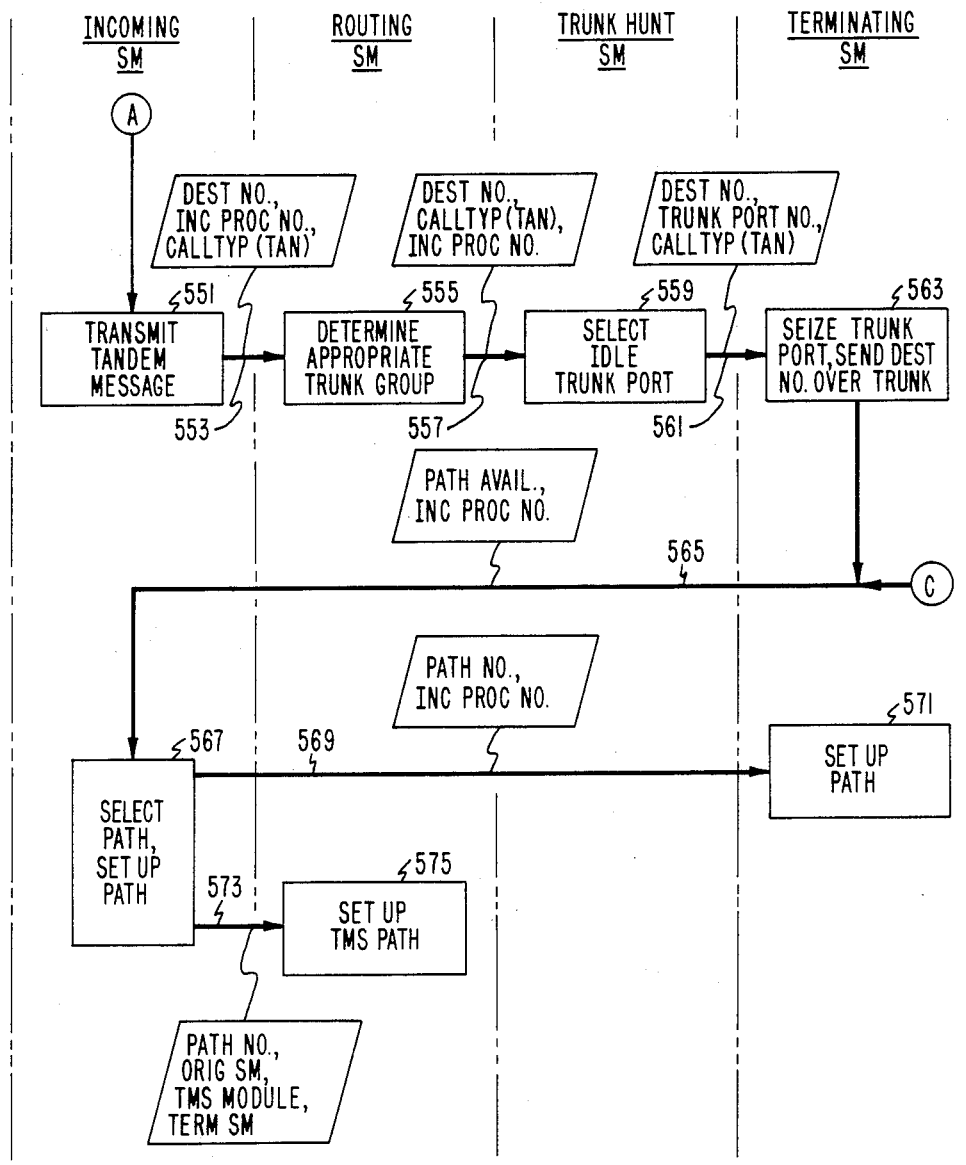
Figure 10:
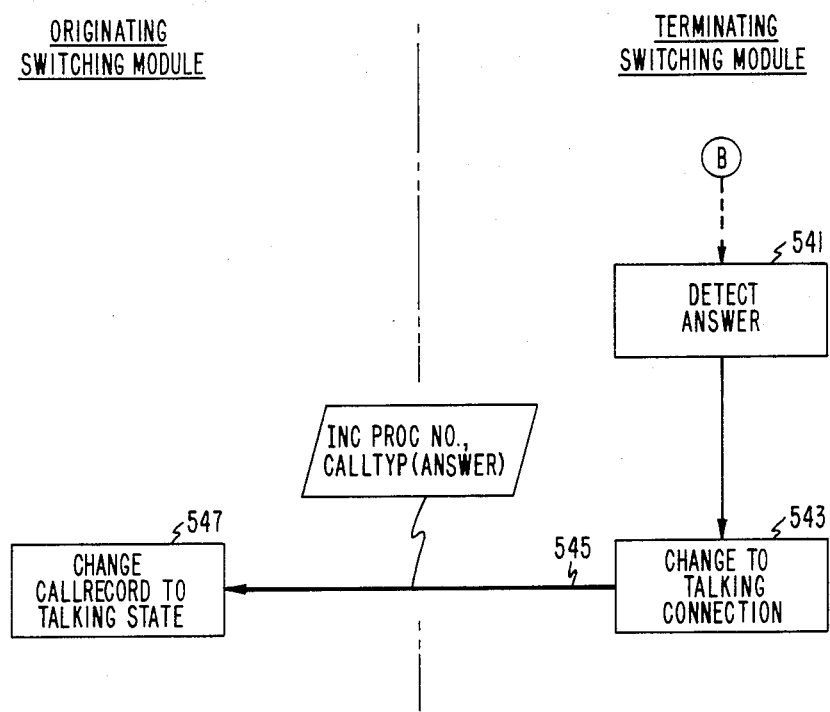

Once the group which has an idle trunk has been found, a candidate trunk is selected but not marked busy (action box 957). A message is then broadcast to all switching modules indicating the selection of this candidate (action box 959). In response to this broadcast message, other modules, including the terminating switching module connected to the candidate trunk, mark the selected trunk busy (action box 963). The sending module, in this case the incoming switch module 1, also receives this broadcast message (action box 961) and makes a test 965 to see if the selected trunk is still not marked busy in its own records. If the result of this test is negative, i.e., if that trunk is now marked busy, it is an indication that another module selected the trunk and sent out a broadcast message before the broadcast message by the incoming switching module was sent out; therefore this trunk is not available for use on this call. In that case, action box 957 is reentered to select another candidate trunk. In the normal case, the selected trunk is still not marked busy; in action box 967 it is then marked busy. A message 968 is then sent to the terminating switching module specifying the trunk number, the call type, the incoming process number, and path availability. Upon receipt of this message, terminating switching module in action box 969 sends the destination number over that trunk and returns to the incoming switch module a message similar to message 565 of FIG. 9. The rest of the call processing is the same as shown in FIG. 9, entered in action box 567.

Whenever a trunk is released (action box 981, FIG. 11), a trunk release broadcast message is sent (action box 983) to all switching modules. This allows all switching modules to have an up-to-date record of the availability of all trunks since broadcast messages are sent whenever a trunk is seized or released. Selection of a candidate is equivalent to seizure by some module, since the first module to select a given candidate will then seize that port. In response to the broadcast message concerning the release, each module, such as the terminating switching module, receiving the broadcast message marks the trunk idle (action box 987) and the module which sent the broadcast message, such as the incoming switching module, also marks the trunk idle when it receives its own broadcast message (action box 985). This trunk hunting procedure can be similarly used for hunting for an idle port in any multiport group.

Note that this alternative mode of selecting trunks is only one way of using a common medium or other broadcast means to pass data among the modules so that each module can hunt for an idle port in a multiport group. For example, if a token method is used to access the common medium, including a ring, and if the module performing the hunt does so only when the token is in its possession, and if response to broadcast messages for making a port busy is given interrupt level priority over port hunting, and if a port make busy broadcast message is sent out before the token is released, then a module performing the hunt can have confidence that a port marked available has not been hunted for and selected by another module; in that case, a candidate port is, in fact, a port that can be selected since the message announcing any previously selection of a candidate port would have arrived and have been acted upon before the hunt was initiated. Any arrangement will suffice which ensures that a candidate port is still available at the time a commitment is made to select that port. Similarly, any broadcasting arrangement that will accomplish the goal of notifying other processors rapidly can be used.

If port seizure messages are broadcast, the chance of a race is greatly diminished. While the method shown in FIG. 11 eliminates races, it is also possible to assume that the candidate port is available; if the unlikely race has been lost, a message is sent from the module containing that candidate port indicating that the candidate port is busy, and that another port should be selected. This method can also be applied to the more general resource seizure problem, and can be augmented, if desired, by an acknowledgment message indicating that the candidate resource or port has been successfully seized. By using a different order of hunting for an available port in different modules, the chance of a race can be further diminished.

This method of notifying modules of the availability and unavailability of trunks in a group may be more generally applied to the notification of processors in a distributed processing system of the availability and unavailability of resources such as a printer. Further, it is not restricted to use on resources which are grouped but can, as in the case of a single printer, be used for single resources. The use of this approach permits each processor in a distributed processing system to make its own decision as to whether a resource is available. The resource is available, the processor seizes that resource; otherwise, the processor defers such seizure until the resource or resources becomes available, or otherwise disposes of the request for that resource. The need for centralized allocation of the resource either by the controller of the resource or by a centralized controller or processor is thereby eliminated.

The above discussion has been in terms of "broadcasting", i.e., sending a message to all processors attached to the common medium. "Multicasting" is another alternative, under which a selected subset of processors receive a message with a given destination identification. Each communication medium interface is equipped to recognize and accept messages identified by one of a group of arbitrary destination addresses; each of the communication medium interfaces which are to receive a group of messages are set up to be responsive to the destination addresses for that group. One such group is the group of module processors, and messages for module processors (but not the administrative module processor or the processor of the time multiplex switch module) are identified with a unique destination address; this address can then be used for multicasting port availability data messages.

Another advantage of having a common medium 90 available for the transmission of data messages among the switching modules is that the initialization of these switching modules can be carried out rapidly because of the high data transmission rate of the common medium. Initialization of a switching module is required whenever the memory of one or more switching module processors has been mutilated because of a hardware or software error or whenever the system is turned on initially. Sometimes, initialization is also required when program changes are introduced into the system. Whenever such initialization is required the source of the initialization is the administrative module which has access to the bulk storage disk 735.

Figure 12:
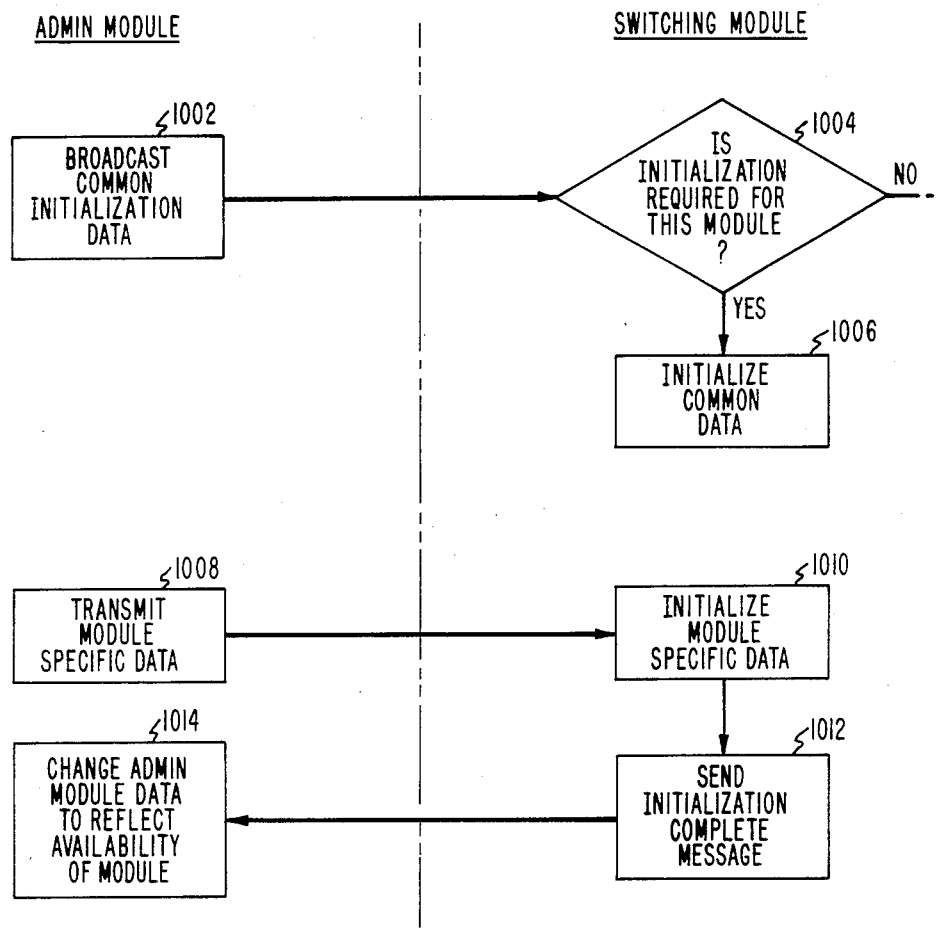
FIG. 12 is a flow diagram of an arrangement for initializing the memory of the processors of the switching modules of the switching system of FIGS. 2 and 3.

The initialization data usually comprise a substantial body of data that is common to all switching modules (such as program text) and some initialization data which is peculiar to each switching module. The initialization data that is common is broadcast or multicast by the administrative module (action box 1002, FIG. 12). Each of the switching modules which receive this broadcast makes a test 1004 of whether initialization is required for this module. If not, the broadcast message is ignored. If so, the common data for this switching module is initialized (action box 1006). Subsequently, the administrative module transmits module specific data to each module in turn. Action box 1008 indicates that the administrative module transmits module specific data for a specific module. Upon receipt of this data from the communication medium, the switching module initializes module specific data (action box 1010) and after initialization has been completed, sends an initialization complete message (action box 1012) back to the administrative module. In response, the administrative module changes its own data base to reflect the availability of the switching module for service (action box 1014).

The above description shows how a common data communication arrangement can be used in a distributed telecommunication system in such a way that the central or administrative processor need not be used for establishing telephone calls, or more generally, communications, and for initializing the processors of such a system. The arrangement permits the distributed processors to send messages rapidly for the purposes of exchanging or accessing data and for requesting processing or call control actions. The description also shows how such an arrangement can be used for allocating shared resources in a distributed control system. It is to be understood that the above-described embodiment is merely illustrative of the principles of the invention; other arrangements may be devised by those skilled in the art without departing from the spirit or scope of the invention.

What is claimed is:

1. A distributed control telecommunication switching system for connection to a plurality of lines and trunks, comprising:
    a plurality of switching modules, each module comprising a plurality of ports for connection to said lines and trunks, a plurality of intermodule outlets, connection means operable for selectively setting up connections among ones of said ports and among ones of said ports and ones of said outlets, and module processor means for controlling connection operations of said connection means;
    means for selectively interconnecting outlets of different ones of said modules;
    a common data communication means connected to each of said module processor means for communicating data packets among all of said module processor means; and
    an administrative processor for communicating with a man-machine interface;
    wherein each of said module processor means generates first data packets for communication over said common data communication means to others of said module processor means and is responsive to reception of said first data packets from others of said module processor means for controlling connection operations of said connection means;
    wherein said module processor means collectively comprise substantially all software and data tables required for controlling intramodule and intermodule call connections substantially independently of said administrative processor.

2. The switching system of claim 1 wherein said common data communication means concurrently transmits data packets from said administrative processor to a plurality of said module processor means.

3. The switching system of claim 1 wherein said administrative processor generates initialization data for communication over said common data communication means to a predetermined plurality of said module processor means and each of said predetermined plurality of module processor means receives said initialization data from said common data communication means.

4. The distributed control switching system of claim 1 in which said means for selectively interconnecting outlets comprises a time multiplex switch connected to predetermined ones of said outlets of preselected ones of said modules.

5. The distributed control switching system of claim 4 wherein said first data packets comprise data for selecting an available outlet for use in setting up an intermodule call.

6. The distributed control switching system of claim 1 wherein said means for selectively interconnecting outlets substantially permanently interconnects outlets of predetermined ones of said switching modules.

7. The distributed control switching system of claim 6 wherein said first data packets comprise data for selecting an available outlet for use in setting up an intermodule call.

8. The distributed control switching system of claim 1 wherein a subset of the ports of the system is categorized into groups, wherein members of one of said groups are distributed over a predetermined plurality of said modules and wherein one of said module processor means stores status information of all ports in said one of said groups.

9. In a distributed control switching system comprising a plurality of modules each comprising a plurality of ports, said modules interconnected via a plurality of intermodule outlets connected to each of said modules, a common data communication means connected to each of said modules for transmitting data messages among said modules, and an administrative processor for communicating with a man-machine interface, a method of setting up a call between a source port and a destination port for communication with a destination station defined by a particular destination directory number, substantially without the use of said administrative processor or any other central processor, comprising the steps of:
    detecting a seizure from said source port in a first of said modules;
    receiving data representing said particular destination directory number;
    translating said particular destination directory number to find an identity of a second module containing a destination port for communicating with said destination station;
    sending a first message to said second module over said common communication means, said first message comprising an identity of said destination port; and
    sending a second message to said first module over said common communication means, said second message comprising an identity of an intermodule outlet from said second module to said first module.

10. In a distributed control switching system wherein a subset of ports is grouped into a plurality of multiport hunt groups, all members of each group communicating with at least one destination station and defined by at least one group destination directory number, the method of claim 9 wherein each of said multiport hunt groups is assigned to a corresponding hunting module for hunting for an available port for said each hunt group, and wherein said step of translating comprises the steps of:

translating said particular destination directory number to find an identity of an associated multiport hunt group;

translating said identity of said associated multiport hunt group to find an identity of a corresponding hunting module for hunting for an available port in said multiport hunt group;

sending, in response to said step of translating to find an identity of a corresponding hunting module, a message requesting a hunt for an available port in said multiport hunt group to said corresponding hunting module; and hunting in said corresponding hunting module for an available port in said hunting group and translating an identity of said available port to an identity of the module containing said available port.

11. The method of claim 9 wherein said step of sending a first message further comprises the step of generating intermodule outlet availability data of said first module and including said availability data in said first message.

12. The method of claim 9 further comprising the step of:

sending third messages from said administrative processor concurrently to a plurality of said module processor means for initializing common data in each of said plurality of said module processor means.

13. In a distributed control switching system further comprising an intermodule switching network for setting up connections between intermodule outlets of different ones of said modules, the method of claim 9 further comprising the step of:

sending a third message comprising said identity of said intermodule outlet to said intermodule switching network.

14. A distributed control telecommunication switching system for connection to a plurality of lines and trunks, comprising:

a plurality of switching modules, each module comprising a plurality of ports for connection to said lines and trunks, a plurality of intermodule outlets, connection means operable for selectively setting up connections among ones of said ports and among ones of said ports and ones of said outlets, and module processor means for controlling connection operations of said connection means, means for selectively interconnecting outlets of different ones of said modules;

a common data communication means connected to each of said module processor means for communicating data packets among all of said module processor means;

each of said module processor means generates first data packets for communication over said common data communication means to others of said module processor means and is responsive to reception of said first data packets from others of said module processor means for controlling connection operations of said connection means; and said module processor means collectively comprise substantially all program instructions and data tables required for controlling intramodule and intermodule call connections.

15. The combination of claim 14 in which said means for selectively interconnecting outlets comprises a time multiplex switch connected to predetermined ones of said outlets of pre-selected ones of said modules.

16. The combination of claim 15 wherein said first data packets comprise data for selecting available outlets for use in setting up an intermodule call.

17. The combination of claim 14 wherein said means for selectively interconnecting outlets substantially permanently interconnects outlets of predetermined ones of said switching modules.

18. The combination of claim 17 wherein said first data packets comprise data for selecting available outlets for use in setting up an intermodule call.

19. The combination of claim 14 wherein a subset of the ports of the system is categorized into groups, wherein members of one of said groups are distributed over a predetermined plurality of said modules and wherein one of said module processor means stores status information of all ports in said one of said groups.

20. In a distributed control switching system comprising a plurality of modules each comprising a plurality of ports, said modules interconnected via a plurality of intermodule outlets connected to each of said modules, and a commondata communication means connected to each of said modules for transmitting data messages among said modules, a method of setting up a call between a source port and a destination port for communication with a destination station defined by a particular destination directory number, comprising the steps of:

detecting a seizure from said source port in a first of said modules;

receiving data representing said particular destination directory number;

translating said particular destination directory number to find an identity of a second module containing a destination port for communicating with said destination station;

sending a first message to said second module over said common communication means, said first message comprising an identity of said destination port; and sending a second message to said first module over said common communication means, said second message comprising an identity of an intermodule outlet from said second module to said first module.

* * * * *

UNITED STATES PATENT AND TRADEMARK OFFICE
CERTIFICATE OF CORRECTION

PATENT NO.   : 4,720,854
DATED        : January 19, 1988
INVENTOR(S)  : Douglas S. Sand It is certified that error appears in the above-identified patent and that said Letters Patent is hereby corrected as shown below:

In the Title:

after "TELECOMMUNICATION" add --SWITCHING--.

In the Specification:

Column 8, line 44, change "cell" to --call--.

In the Claims:

Claim 20, column 20, line 33, change "commondata" to --common data--.

Signed and Sealed this

Twenty-third Day of August, 1988

Attest:

DONALD J. QUIGG

*Attesting Officer*          *Commissioner of Patents and Trademarks*